(12) United States Patent
Wills et al.

(10) Patent No.: US 11,062,143 B2
(45) Date of Patent: *Jul. 13, 2021

(54) SYSTEMS AND METHODS FOR GENERATING A VIDEO SUMMARY

(71) Applicant: GoPro, Inc., San Mateo, CA (US)

(72) Inventors: Jonathan Wills, San Mateo, CA (US); Daniel Tse, San Mateo, CA (US); Desmond Chik, Mountain View, CA (US); Brian Schunck, San Diego, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/844,542

(22) Filed: Apr. 9, 2020

(65) Prior Publication Data
US 2020/0234054 A1 Jul. 23, 2020

Related U.S. Application Data

(63) Continuation of application No. 15/959,954, filed on Apr. 23, 2018, now Pat. No. 10,726,272, which is a
(Continued)

(51) Int. Cl.
*G06K 9/00* (2006.01)
*H04N 5/225* (2006.01)
(Continued)

(52) U.S. Cl.
CPC .......... *G06K 9/00751* (2013.01); *G06K 9/66* (2013.01); *G11B 27/031* (2013.01); *G11B 27/3081* (2013.01); *H04N 5/225* (2013.01)

(58) Field of Classification Search
CPC . G06K 9/00751; G11B 27/3081; H04N 5/225
See application file for complete search history.

(56) References Cited

U.S. PATENT DOCUMENTS

| 6,633,685 B1 | 10/2003 | Kusama |
| 7,512,886 B1 | 3/2009 | Herberger |

(Continued)

FOREIGN PATENT DOCUMENTS

| JP | H09181966 A | 7/1997 |
| JP | 2005252459 A | 9/2005 |

(Continued)

OTHER PUBLICATIONS

FFmpeg, "Demuxing," Doxygen, Dec. 5, 2014, 15 Pages, [online] [retrieved on Jul. 13, 2015] Retrieved from the internet <URL:https://www.ffmpeg.org/doxygen/2.3/group_lavf_encoding.html>.

(Continued)

*Primary Examiner* — Girumsew Wendmagegn
(74) *Attorney, Agent, or Firm* — Esplin & Associates, PC

(57) ABSTRACT

Systems and method of generating video summaries are presented herein. Information defining a video may be obtained. The video may include a set of frame images. Parameter values for parameters of individual frame images of the video may be determined. Interest weights for the frame images may be determined. An interest curve for the video that characterizes the video by interest weights as a function of progress through the set of frame images may be generated. One or more curve attributes of the interest curve may be identified and one or more interest curve values of the interest curve that correspond to individual curve attributes may be determined. Interest curve values of the interest curve may be compared to threshold curve values. A subset of frame images of the video to include within a video summary of the video may be identified based on the comparison.

20 Claims, 4 Drawing Sheets

Related U.S. Application Data continuation of application No. 15/244,690, filed on Aug. 23, 2016, now Pat. No. 9,953,224.

(51) Int. Cl.
*G06K 9/66* (2006.01)
*G11B 27/031* (2006.01)
*G11B 27/30* (2006.01)

(56) References Cited

U.S. PATENT DOCUMENTS

| | | | |
|---|---|---|---|
| 7,885,426 | B2 | 2/2011 | Golovchinsky |
| 7,970,240 | B1 | 6/2011 | Chao |
| 8,180,161 | B2 | 5/2012 | Haseyama |
| 8,606,073 | B2 | 12/2013 | Woodman |
| 8,774,560 | B2 | 7/2014 | Sugaya |
| 8,971,623 | B2 | 3/2015 | Gatt |
| 8,990,328 | B1 | 3/2015 | Grigsby |
| 9,041,727 | B2 | 5/2015 | Ubillos |
| 9,142,257 | B2 | 9/2015 | Woodman |
| 9,342,376 | B2 | 5/2016 | Jain |
| 9,418,283 | B1 | 8/2016 | Natarajan |
| 9,953,224 | B1 * | 4/2018 | Wills ............ G11B 27/031 |
| 10,726,272 | B2 * | 7/2020 | Wills ............ G06K 9/66 |
| 2002/0165721 | A1 | 11/2002 | Chang |
| 2004/0001706 | A1 | 1/2004 | Jung |
| 2005/0025454 | A1 | 2/2005 | Nakamura |
| 2005/0108031 | A1 | 5/2005 | Grosvenor |
| 2005/0198018 | A1 | 9/2005 | Shibata |
| 2006/0080286 | A1 | 4/2006 | Svendsen |
| 2006/0115108 | A1 | 6/2006 | Rodriguez |
| 2008/0123976 | A1 | 5/2008 | Coombs |
| 2008/0183843 | A1 | 7/2008 | Gavin |
| 2009/0019995 | A1 | 1/2009 | Miyajima |
| 2009/0027499 | A1 | 1/2009 | Nicholl |
| 2009/0125559 | A1 | 5/2009 | Yoshino |
| 2009/0252474 | A1 | 10/2009 | Nashida |
| 2010/0046842 | A1 | 2/2010 | Conwell |
| 2010/0086216 | A1 | 4/2010 | Lee |
| 2010/0161720 | A1 | 6/2010 | Colligan |
| 2010/0199182 | A1 | 8/2010 | Lanza |
| 2010/0274714 | A1 | 10/2010 | Sims |
| 2010/0318660 | A1 | 12/2010 | Balsubramanian |
| 2011/0103700 | A1 | 5/2011 | Haseyama |
| 2011/0137156 | A1 | 6/2011 | Razzaque |
| 2011/0170086 | A1 | 7/2011 | Oouchida |
| 2011/0206351 | A1 | 8/2011 | Givoly |
| 2011/0242098 | A1 | 10/2011 | Tamaru |
| 2012/0014673 | A1 | 1/2012 | O'Dwyer |
| 2012/0027381 | A1 | 2/2012 | Kataoka |
| 2012/0030263 | A1 | 2/2012 | John |
| 2012/0141019 | A1 | 6/2012 | Zhang |
| 2012/0210205 | A1 | 8/2012 | Sherwood |
| 2012/0210228 | A1 | 8/2012 | Wang |
| 2012/0246114 | A1 | 9/2012 | Edmiston |
| 2012/0283574 | A1 | 11/2012 | Park |
| 2013/0182166 | A1 | 7/2013 | Shimokawa |
| 2013/0235071 | A1 | 9/2013 | Ubillos |
| 2013/0239051 | A1 | 9/2013 | Albouze |
| 2013/0330019 | A1 | 12/2013 | Kim |
| 2014/0149865 | A1 | 5/2014 | Tanaka |
| 2014/0152762 | A1 | 6/2014 | Ukil |
| 2014/0282661 | A1 | 9/2014 | Martin |
| 2014/0321831 | A1 | 10/2014 | Olsen |
| 2015/0039646 | A1 | 2/2015 | Sharifi |
| 2015/0071547 | A1 | 3/2015 | Keating |
| 2015/0113009 | A1 | 4/2015 | Zhou |
| 2015/0156247 | A1 | 6/2015 | Hensel |
| 2015/0287435 | A1 | 10/2015 | Land |
| 2016/0029105 | A1 | 1/2016 | Newman |
| 2016/0094601 | A1 | 3/2016 | Besehanic |
| 2016/0103830 | A1 | 4/2016 | Cheong |
| 2016/0189752 | A1 | 6/2016 | Galant |
| 2016/0260000 | A1 | 9/2016 | Yamakawa |
| 2016/0286235 | A1 | 9/2016 | Yamamoto |

FOREIGN PATENT DOCUMENTS

| | | |
|---|---|---|
| JP | 2006053694 A | 2/2006 |
| JP | 2008059121 A | 3/2008 |
| JP | 2009053748 A | 3/2009 |
| JP | 2011188004 A | 9/2011 |
| WO | 2006001361 A1 | 1/2006 |
| WO | 2009040538 A1 | 4/2009 |
| WO | 2012057623 A1 | 5/2012 |
| WO | 2012086120 A1 | 6/2012 |

OTHER PUBLICATIONS

FFmpeg, "Muxing," Doxygen, Jul. 20, 2014, 9 Pages, [online] [retrieved on Jul. 13, 2015] Retrieved from the internet <URL: https://www.ffmpeg.org/doxyg en/2. 3/structA VP a ck et. html>.

Han et al., Deep Compression: Compressing Deep Neural Networks with Pruning, Trained Quantization and Huffman Coding, International Conference on Learning Representations 2016, 14 pgs.

He et al., 'Deep Residual Learning for Image Recognition,' arXiv:1512. 03385, 2015, 12 pgs.

Iandola et al., 'SqueezeNet: AlexNet-level accuracy with 50x fewer parameters and <0.5MB model size', arXiv:1602.07360v3 [cs.CV] Apr. 6, 2016 (9 pgs.).

Ioffe et al., 'Batch Normalization: Accelerating Deep Network Training by Reducing Internal Covariate Shift,' arXiv:1502.03167, 2015, 11 pgs.

Japanese Office Action for JP Application No. 2013-140131, dated Aug. 5, 2014, 6 pages.

Nicole Lee, Twitter's Periscope is the best livestreaming video app yet; Mar. 26, 2015 URL:http://www.engadget.com/2015/03/26/periscope/ [Retrieved Aug. 25, 2015] 11 pages.

Office Action for U.S. Appl. No. 13/831,124, dated Mar. 19, 2015, 14 pages.

Parkhi et al., 'Deep Face Recognition,' Proceedings of the British Machine Vision, 2015, 12 pgs.

PCT International Preliminary Report on Patentability for PCT/US2015/023680, dated Oct. 4, 2016, 10 pages.

PCT International Search Report and Written Opinion for PCT/US15/12086 dated Mar. 17, 2016, 7 pages.

PCT International Search Report and Written Opinion for PCT/US16/31076, dated Aug. 8, 2016, 19 Pages.

PCT International Search Report for PCT/US15/23680 dated Aug. 3, 2015, 4 pages.

PCT International Search Report for PCT/US15/41624 dated Nov. 4, 2015, 5 pages.

PCT International Written Opinion for PCT/US2015/041624, dated Dec. 17, 2015, 7 pages.

PSonar URL: http://www.psonar.com/about retrieved on Aug. 24, 2016, 3 pages.

Schroff et al., 'FaceNet: A Unified Embedding for Face Recognition and Clustering,' IEEE Conference on Computer Vision and Pattern Recognition (CVPR), 2016, 10 pgs.

Tran et al., 'Learning Spatiotemporal Features with 3D Convolutional Networks', arXiv:1412.0767 [cs.CV] Dec. 2, 2014 (9 pgs).

Yang et al., 'Unsupervised Extraction of Video Highlights Via Robust Recurrent Auto-encoders' arXiv:1510.01442v1 [cs.CV] Oct. 6, 2015 (9 pgs).

* cited by examiner

SYSTEMS AND METHODS FOR GENERATING A VIDEO SUMMARY

FIELD

This disclosure relates to systems and methods configured to generate a video summary.

BACKGROUND

Video applications may allow a user to manually generate a video summary, e.g., a preview of a video. Manual input may be time consuming and may discourage users from generating video summaries.

SUMMARY

This disclosure relates to generating a video summary. Information defining a video may be obtained. The information defining the video may include, for example, a video file. The video file may be obtained from electronic storage of one or more video capture devices and/or other storage locations. The video may include one or more of a visual component, an audio component, and/or other components. The visual component may include multiple frame images. The multiple frame images may be presented in an ordered sequence. The audio component may include recorded and/or provided audio that may accompany the visual component. The audio component may be synchronized with the visual component. Information defining the video may further include metadata associated with the video.

A system that generates a video summary may include one or more physical processors and/or other components. The one or more physical processors may be configured by machine-readable instructions. Executing the machine-readable instructions may cause the one or more physical processors to facilitate generating a video summary. The machine-readable instructions may include one or more computer program components. The computer program components may include one or more of a video component, a parameter component, an interest weight component, an interest curve component, a video summary component, and/or other computer program components.

The video component may be configured to obtain information defining one or more videos. A video may include a set of frame images.

The parameter component may be configured to determine individual parameter values for one or more parameters of individual frame images of a video. The parameter values may include a first set of parameter values for a first parameter and/or other parameters of the individual frame images in the set of frame images.

The interest weight component may be configured to determine interest weights for individual frame images based on individual parameter values of individual parameters of the individual frame images, and/or other information. The interest weights may include a first set of interest weights for the set of frame images determined from the first set of parameter values and/or other information.

The interest curve component may be configured to generate an interest curve for a video based on individual interest weights of individual frame images. An interest curve may characterize a video by interest weights as a function of progress through a set of frame images of a video. A first interest curve may be comprised of a set of interest curve values correspond to individual ones of the interest weights in the first set of interest weights and individual ones of the frame images in the set of frame images.

The interest curve component may be configured to identify one or more curve attributes of one or more interest curves. By way of non-limiting illustration, one or more curve attributes of the first interest curve may include a first curve attribute and/or other curve attributes.

The interest curve component may be configured to determine individual interest curve values of individual interest curves that may correspond to individual curve attributes. By way of non-limiting illustration, a first set of interest curve values of the first interest curve corresponding to the first curve attribute may be determined.

The video summary component may be configured to compare individual interest curve values of curve attributes of individual interest curves to individual threshold curve values of the curve attributes. By way of non-limiting illustration, the first set of interest curve values may be compared to one or more threshold values corresponding to the first curve attribute.

The video summary component may be configured to identify a subset of frame images of a video to include within a video summary of the video based on a comparison of individual interest curve values of an interest curve to one or more threshold curve values. The video summary component may be configured to generate a video summary based on an identified subset of frame images.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
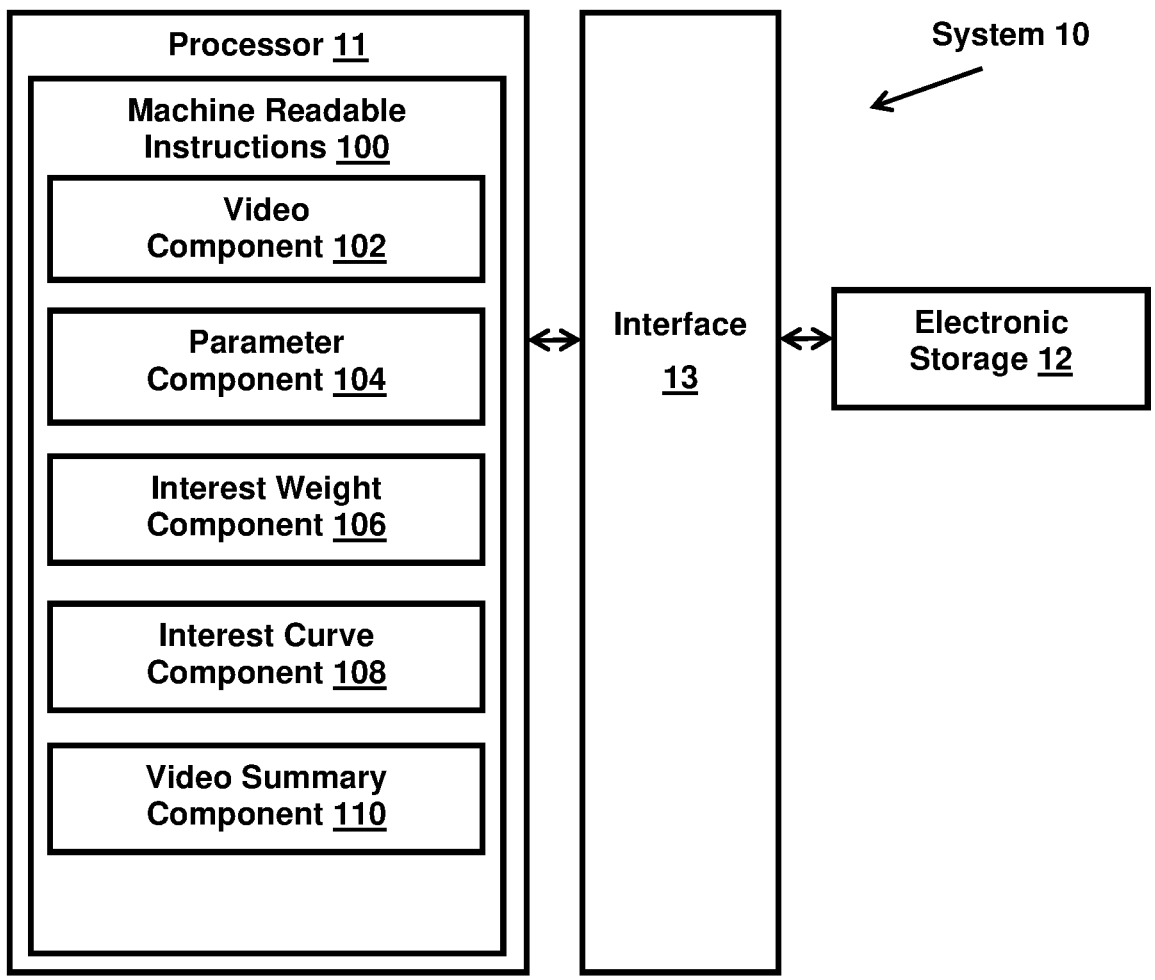
FIG. 1 illustrates a system configured to generate a video summary, in accordance with one or more implementations.

FIG. 1 illustrates a system 10 configured to generate a video summary. System 10 may include one or more of a processor 11, electronic storage 12, interface 13 (e.g., bus, wireless interface, etc.), and/or other components. Information defining a video may be obtained by processor 11. The information defining the video may include, for example, a video file. The video file may be obtained from electronic storage of one or more video capture devices and/or other storage locations. The video may include one or more of a visual component, an audio component, and/or other components. The visual component may include multiple frame images. The audio component may include recorded and/or provided audio that may accompany the visual component. The audio component may be synchronized with the visual component. Information defining the video may further include metadata associated with the video.

Interest weights for individual frame images may be determined based on one or more parameter values of one or more parameters of individual frame images of a video. An interest curve may be generated based on the interest weights and/or other information. The interest curve and/or other information may facilitate identifying one or more frame images to include in a video summary of the video. A video summary may include one or more of a video preview, a highlight reel, a trailer, a teaser, an animated GIF, a music video, and/or type of video summary.

Electronic storage 12 may include electronic storage medium that electronically stores information. Electronic storage 12 may store software algorithms, information determined by processor 11, information received remotely, and/or other information that enables system 10 to function properly. For example, electronic storage 12 may store information relating to videos, frame images, extracting frame images, interest weights, interest curves, video summaries, and/or other information.

Processor 11 may be configured to provide information processing capabilities in system 10. As such, processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. Processor 11 may be configured by machine readable instructions 100. Executing machine-readable instructions 100 may facilitate generating a video summary. Machine-readable instructions 100 may include one or more computer program components. Machine readable instructions 100 may include one or more of a video component 102, a parameter component 104, an interest weight component 106, an interest curve component 108, a video summary component 110, and/or other computer program components.

Video component 102 may be configured to obtain information defining one or more videos, and/or other information. The information defining the video may include, for example, a video file. A video may include one or more of a video clip captured by one or more of a video capture device, multiple video clips captured by a video capture device, multiple video clips captured by multiple separate video capture devices, and/or other devices. A video may include multiple video clips captured at the same time and/or multiple video clips captured at different times. A video may include a video clip processed by a video application, multiple video clips processed by a video application and/or multiple video clips processed by separate video applications.

The video defined by a video file may include one or more of a visual component, an audio component, and/or other components. The visual component may include a set of frame images. The set of frame images may be presented in an ordered sequence over a duration of the video. By way of non-limiting illustration, presentation of the video may progress through the set of frame images from a starting frame image to an ending frame image. The audio component may include recorded and/or provided audio that may accompany the visual component. The audio component may be synchronized with the visual component.

In some implementations, information defining a video may include metadata associated with the video. Metadata may include one or more of one or more of capture settings of a capture device, sensor output of one or more sensors coupled to the capture device, user-provided information, date and/or time associated with video capture, and/or other information. In some implementations, capture settings of a capture device may include one or more of a resolution, a frame rate, one or more lens settings (e.g., aperture size, focal length, field-of-view, and/or other lens settings), a color saturation, a brightness, a contrast, a hue, a sharpness, depth of field, aspect ratio, ISO, a color filter selection, a mode selection, and/or other capture settings.

In some implementations, sensors coupled to a capture device may include one or more of a geo-location sensor, orientation sensor, pressure sensor, light sensor, accelerometer, temperature sensor, and/or other sensors. In some implementations, user-provided information may include one or more of user-provided highlights of moments of interest within a video, information input by a user (e.g., keywords, captions, comments, and/or other information), and/or other information.

Video component 102 may obtain information defining one or more videos from one or more storage locations. A storage location may include electronic storage 12, electronic storage of one or more capture devices (not shown in FIG. 1), and/or other locations. Video component 102 may be configured to obtain information defining one or more videos during acquisition of the information and/or after acquisition of the information by one or more capture devices. For example, video component 102 may obtain information defining a video while the video is being captured by one or more capture devices. Video component 102 may obtain information defining a video after the video has been captured and stored in memory (e.g., electronic storage 12, etc.). In some implementations, one or more videos may be characterized by one or more encoded framerates. An encoded framerate may define a number of frame images within a video per a time duration (e.g., number of frame images per second, etc.).

By way of non-limiting illustration, video component 102 may be configured to obtain information defining a first video and/or other videos. The first video may include a visual component, an audio component, and/or other components. The visual component may include a set of frame images. The information defining the first video may further include metadata associated with the first video. The metadata associated with the first video may include one or more of capture settings of one or more capture devices used to capture the first video, sensor output of one or more sensors coupled to the one or more capture devices, user-provided information, and/or other information.

Figure 3:
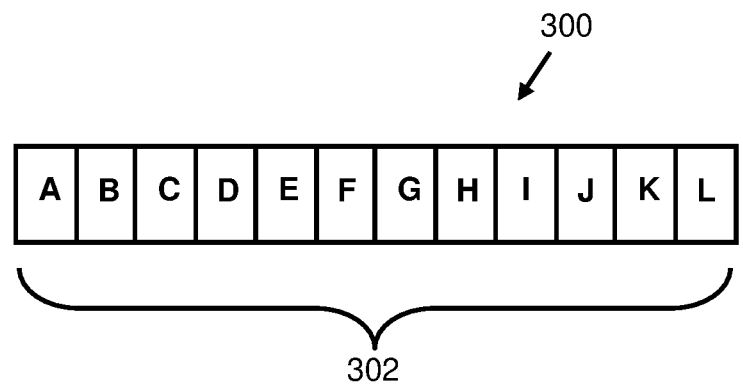
FIG. 3 illustrates an exemplary video having a set of frame images.

FIG. 3 illustrates an exemplary graphical representation of a video 300 having a set of frame images 302. Individual ones of the frame images in the set of frame images 302 may be labeled for illustrative purpose. The set of frame images 302 are labeled in alphabetical order from "A" to "L."

Returning to FIG. 1, parameter component 104 may be configured to determine parameter values for one or more parameters of a video and/or individual frame images of a video, and/or other information. In some implementations, parameters may include one or more of a scene parameter, a quality parameter, a capture parameter, an audio parameter, and/or other parameters.

A value of a scene parameter may specify one or more scene features of an individual frame image and/or other information. Scene features may include one or more of feature points, objects, faces, colors, scene compilation, text in a scene, and/or other scene features. Scene features may be determined by one or more detection and/or recognition techniques. By way of non-limiting illustration, detection and/or recognition techniques may include one or more of face detection, object recognition, SURF, SIFT, HOG, GLOH, Deep Neural Network-based embedding (e.g., CNN features, Autoencoder features, RNN representations of video activity or video composition over time, and/or features reflecting text in the scene), and/or other signal and image processing techniques.

A value of an quality parameter may specify one or more quality attributes of individual frame images. Quality attributes may include one or more of blurriness (e.g., motion blur), glare, saturation, brightness, contrast, sharpness, framing of an object of interest, a representativeness of a frame with respect to an overall context of a video, and/or other quality attributes. Values of a quality parameter may be determined by one or more quality attribute detection techniques. Quality attribute detection techniques may include one or more of blur detection, oriented energy analysis, gradient-based analysis (e.g., brightness gradients, color gradients, texture gradients, and/or other gradient-based analysis), DPI, detection and recognition of objects of interest, and/or other techniques.

A value of a capture parameter may specify information included in metadata of a video file. By way of non-limiting illustration, a value of a capture parameter may specify one or more of one or more capture settings of a capture device at individual ones of the frame images included in metadata, sensor output of one or more sensors coupled to the capture device, user-provided information, and/or other information included in metadata. By way of non-limiting illustration, a value of a capture parameter may specify one or more of a resolution, a frame rate, one or more lens settings (e.g., aperture size, focal length, field-of-view, and/or other lens settings), a color saturation, a brightness, a contrast, a hue, a sharpness, other capture settings as set at a capture device during capture of a video, and/or other metadata.

A value of an audio parameter may specify one or more audio attributes of a video. Audio attributes may include one or more of an volume, an audio type (e.g., one or more speech, silence, music, and/or other audio), and/or other audio attributes. Values of an audio parameter may be determined by one or more audio recognition techniques. Audio recognition techniques may include one or more of Modular Audio Recognition Framework (MARF), Mel Frequency cepstral coefficients (MFCC), Spectrogram analysis, RNN-based audio representations, CNN- or RNN-based classification or regression, and/or other techniques.

By way of non-limiting illustration, considering the above reference first video, parameter component 104 may be configured to determine individual parameter values for one or more parameters of individual frame images of the first video. The parameter values may include a first set of parameter values for a first parameter and/or other parameters of the set of frame images of the first video.

Interest weight component 106 may be configured to determine individual interest weights for individual frame images of one or more videos. Interest weights may be determined based on one or more parameter values of one or more parameters of individual frame images and/or other information. Interest weights may characterize an "interestingness" of individual frame images quantitatively and/or qualitatively. Interestingness may correspond to one or more of a level of appeal to viewing users, how attention grabbing one or more frame images may be to a viewing user, and/or other types of interest. In some implementations, interest weights may be qualitative values that may characterize whether an individual frame image is one or more of "not interesting," "interesting," "most interesting," and/or other characterizations. In some implementations, individual interest weights may be quantitative values that may characterize individual frames by individual values within a range of values (e.g., an interest weight scale). By way of non-limiting illustration, an interest weight scale may comprise values from 0 to 10 (or other ranges), with 0 (or other value) corresponding to "uninteresting," 10 (or other value) correspond to "most interesting," and values there between corresponding to varying degrees of "interestingness."

Individual interest weights of individual frames may be determined from one or more parameter values of one or more parameters of individual frame image based on impact of one or more parameter values of one or more parameters on the individual interest weights. In some implementations, determining an individual interest weight of an individual frame image from multiple parameter values of multiple parameters may be based on impact of individual ones of the parameter values on the individual interest weight and/or impact of sets of parameter values on the individual interest weights. In some implementations, interest weights of individual frame images may start at a base or initial value. In some implementations, one or more parameters values of one or more parameters of an individual frame image may cause an interest weight of the individual frame image to increase, decrease, not change, and/or have a specific valuation.

In some implementations, determining how an individual parameter value and/or a set of parameter values may impact an interest weight may be determined by one or more machine learning techniques, and/or other techniques. Machine learning techniques may include one or more of a convolutional neural network, decision tree learning, supervised learning, minimax algorithm, unsupervised learning, semi-supervised learning, reinforcement learning, deep learning, recurrent neural networks, and/or other techniques. By way of non-limiting illustration, one or more user-provided exemplars may be utilized at an initialization stage of a machine learning process. The user-provided exemplars may specify impact of one or more parameter values of one or more parameters on an interest weight valuation. For example, exemplars may specify that a parameter value of a parameter and/or a set of parameter values of one or more parameters may provide a specific impact on interest weight valuation. The specific impact may include one or more of a decrease of an interest weight by a given amount, an increase of an interest weight by a given amount, no change to interest weight valuation, a specific interest weight valuation, and/or other impacts. By way of non-limiting illustration, an exemplar may specify that a frame image having motion blur may decrease an interest weight of the frame image by a unit value (or other amounts), conveying that the frame image may be uninteresting. By way of non-limiting illustration, an exemplar may specify that a frame image depicting a smiling face may increase an interest weight of the frame image by a unit value (or other amounts), conveying that the frame image may be interesting. By way of non-limiting illustration, an exemplar may specify that metadata including a specific capture setting of a capture device at a particular frame image may increase an interest weight of the frame image by a unit value (or other amounts), conveying that the frame image may be interesting. By way of non-limiting illustration, an exemplar may specify that metadata including a specific user-provided information may cause an interest weight to have a specific valuation.

By way of non-limiting illustration, considering again the reference first video, interest weight component 106 may be configured to determine individual interest weights for individual frame images in the set of frame images of the first video based on parameter values of individual parameters of the individual frame images of the first video. The interest weights may include a first set of interest weights for the set of frame images of the first video. The first set of interest weights may be determined from the first set of parameter values and/or other parameter values of the frame images in the first set of frame images.

Interest curve component 108 may be configured to generate individual interest curves for one or more videos. An interest curve for a video may be generated based on one or more interest weights of a video and/or other information. An interest curve may characterize a video by interest weights as a function of progress through a set of frame images of the video. Values on an interest curve may be determined based on interest weights and/or other information. By way of non-limiting illustration, a value on an interest curve may have an interest weight component and a frame image progress component. The interest weight component may comprise an interest weight of a given frame image. The frame image progress component may comprise an identification of a frame image at a point within a progress through a set of frame images.

Figure 4:
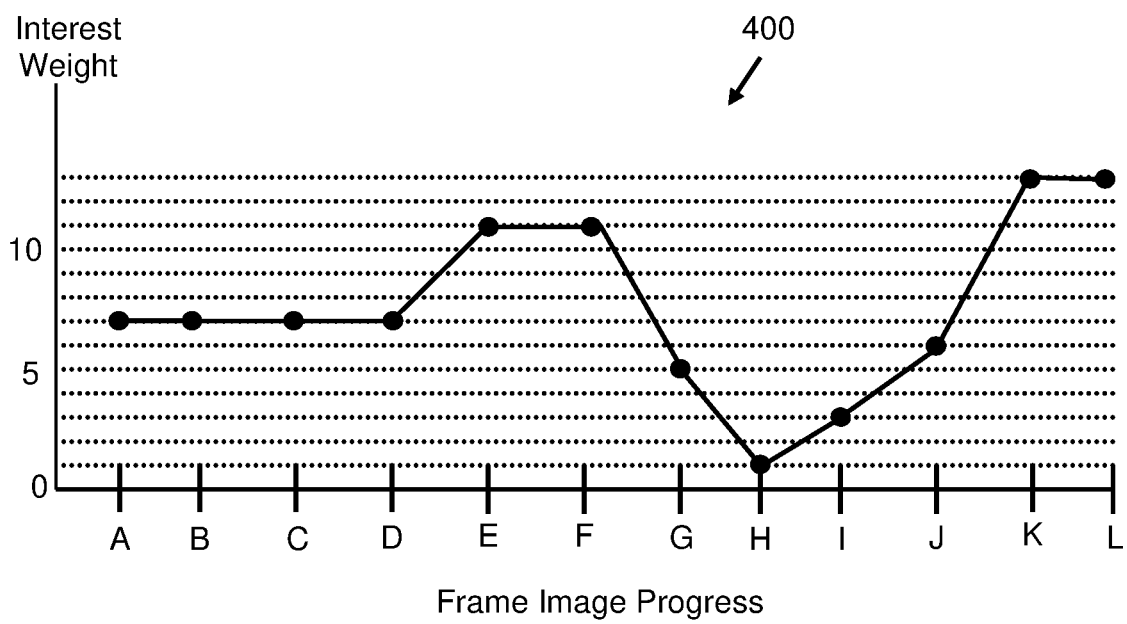
FIG. 4 illustrates an exemplary interest curve for images of the video of FIG. 3.

By way of non-limiting illustration, FIG. 4 shows an exemplary interest curve 400 for the set of frame images 302 of video 300 (FIG. 3). Values of interest curve 400 may have an interest weight component (represented by the Y-axis showing interest weights ranging from 0 to 13) and a frame image progress component (represented by the X-axis showing the progression through frame images A through L). Individual values of interest curve 400 may be determined based on values of interest weights for individual frame images in the set of frame images 302, and/or other information. As shown, interest curve 400 characterizes video 300 by interest weights (Y-axis) as a function of progress through set of frame images 302 (Y-axis) of video 300. By way of non-limiting illustration, interest curve 400 may be comprised of a set of interest curve values (black dots) that individually correspond to individual interest weights determined for individual ones of the frame images in set of frame images 302.

Returning to FIG. 1, interest curve component 108 may be configured to identify one or more curve attributes of one or more interest curves. A curve attribute may characterize one or more features of an interest curve. By way of non-limiting illustration, a feature of an interest curve may include one or more of an overall shape, an inflection point, a maximum, a minimum, a rate of change, a rate of the rate of change, a local maximum, a local minimum, an area under a curve, a plateau, and/or other curve features.

Figure 5:
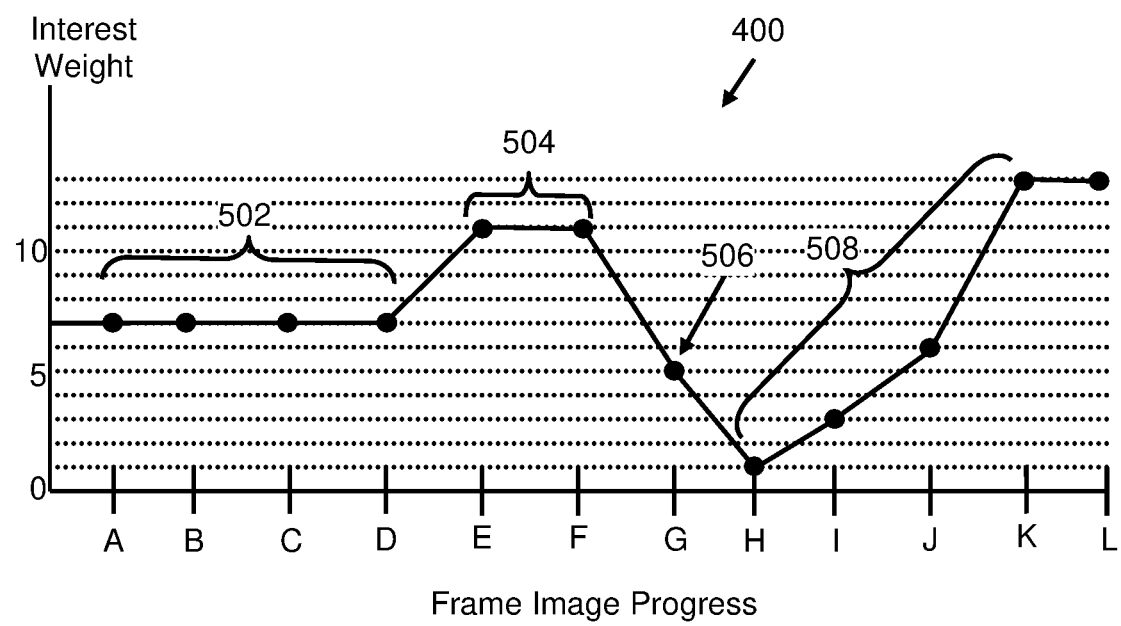
FIG. 5 illustrates identification of one or more curve attributes of the interest curve of FIG. 4.

By way of non-limiting illustration, FIG. 5 shows a set of curve attributes identified in the interest curve 400 of FIG. 4. The set of curve attributes may include one or more of a first curve attribute 502, a second curve attribute 504, a third curve attribute 506, a fourth curve attribute 508, and/or other curve attributes. The first curve attribute 502 may correspond to a portion of interest curve 400 having values that may be constant (e.g., having a "zero" rate of change). The second curve attribute 504 may correspond to a portion of interest curve 400 having one or more local maximum values. The third curve attribute 506 may correspond to a value of interest curve 400 that may comprise an inflection point. The fourth curve attribute 508 may correspond to a portion of interest curve 508 that may have values conveying a predetermined rate of change (e.g., interest weights increasing from a value of "1" to a value of "13" over the course of 4 frame images, or, an average rate of change of 3 interest weight units per frame image).

It is noted that the depiction in FIG. 4 and accompanying descriptions are provided for illustrative purposes only and are not to be considered limiting. In some implementations, an interest curve may have more or fewer curve attributes.

Returning to FIG. 1, interest curve component 108 may be configured to determine individual interest curve values of one or more interest curves that correspond to one or more identified curve attributes. By way of non-limiting illustration, considering again the first set of interest weights determined for the frame images in the first set of frame images of the first video, interest curve component 108 may be configured to generate a first interest curve. Interest curve component 108 may be configured to identify a first curve attribute and/or other curve attributes of the first interest curve. Interest curve component 108 may be configured to determine a first set of interest curve values corresponding to the first curve attribute of the first interest curve.

Returning to FIG. 5, by way of non-limiting illustration, responsive to identifying first curve attribute 502, interest curve component 108 (FIG. 1) may be configured to determine one or more interest curve values of interest curve 400 that may correspond to first curve attribute 502. The interest curve values corresponding to first curve attribute 502 may include a set of four values (e.g., represented by the set of four black dots) having interest weight component values of "7." By way of non-limiting illustration, responsive to identifying second curve attribute 504, interest curve component 108 (FIG. 1) may be configured to determine one or more interest curve values of interest curve 400 that may correspond to second curve attribute 504. The interest curve values corresponding to second curve attribute 504 may include a set of two values (e.g., represented by the set of two black dots) having interest weight component values of "11." By way of non-limiting illustration, responsive to identifying third curve attribute 506, interest curve component 108 (FIG. 1) may be configured to determine one or more interest curve values of interest curve 400 that may correspond to third curve attribute 506. The interest curve value corresponding to third curve attribute 506 may include a value (e.g., represented by a single black dot) having interest weight component value of "5." By way of non-limiting illustration, responsive to identifying fourth curve attribute 508, interest curve component 108 (FIG. 1) may be configured to determine one or more interest curve values of interest curve 400 that may correspond to fourth curve attribute 508. The interest curve values corresponding to fourth curve attribute 508 may include a set of values (e.g., represented by a set of black dots in the figure) having interest weight component values of "1," "3," "6", and "13," and having a rate of change of 3 interest weight units per frame image.

Returning to FIG. 1, video summary component 110 may be configured to determine one or more video summaries of one or more videos. Determining an individual video summary may comprise determining a subset of frame images of a video to include within the video summary. In some implementations, video summary component 110 may be configured such that determining a subset of frame images of a video may comprise one or more of comparing individual interest curve values of an interest curve to threshold curve values of one or more curve attributes, identifying the subset of frame images based on the comparison, and/or other operations. In some implementations, one or more frame images of a video may be included within a video summary based on interest curve values of an interest curve being greater than and/or equal to one or more threshold curve values, and/or by other techniques.

In some implementations, threshold curve values for one or more curve attributes may be specific to content of a video and/or may be determined in other ways. Content of a video may refer to one or more of a video theme, actions portrayed within a video, metadata in a video file, a level of motion in the video, a number and/or identify of people or object in the video, and/or other content of a video.

In some implementations, a video theme may include one or more of action theme, documentary theme, dramatic theme, comedy theme, emotional theme, and/or other themes. A video theme may correspond to one or more responses intended to be elicited from a viewing user. By way of non-limiting illustration, an action theme may intend to elicit an excited response from a viewing user in accordance with a "build up" from a relatively unexciting part of the video (e.g., an insignificant event in the video) to a relatively exciting part of the video (e.g., a significant event in the video). By way of non-limiting illustration, a dramatic theme may intend to elicit an emotional response from a viewing user by unveiling interesting content to a user at a specific time that may otherwise catch the user "off-guard." By way of non-limiting illustration, a comedy theme may be intended to elicit laughter from a viewing user by including audio having laughter and/or portraying actors smiling and/or laughing. In some implementations, threshold curve values for one or more curve attributes may be specific to one or more video themes.

It is noted that the above description of video themes is for illustrative purpose only and is not to be considered limiting. For example, in some implementations, other video themes may be considered and/or individual video themes may be associated with other types of responses intended to be elicited from the viewing user.

In some implementations, actions portrayed in a video may include one or more of action sport actions (e.g., surfing, skateboarding, and/or other action sport actions), ball sport actions (e.g., golfing, football, soccer, tennis, and/or other ball sport actions), a transition (e.g., entering a location such as a building, exiting a location, transitioning between speakers, and/or other transitions), cinematography effects (e.g., cuts, fade-in, fade-out, montage, eyeline match, match cut, jump cut, split screen, and/or other cinematography effects), and/or other actions. In some implementations, threshold curve values for one or more curve attributes may be specific to one or more actions portrayed in a video.

In some implementations, metadata may specify one or more of capture settings of a capture device, sensor output of one or more sensors coupled to the capture device, user-provided information, and/or other information. In some implementations, threshold curve values for one or more curve attributes may be specific to one or more of capture settings of a capture device, sensor output of one or more sensors coupled to the capture device, user-provided information, and/or other metadata. By way of non-limiting illustration, one or more threshold values for one or more curve attributes may be specific to geo-location where a video was captured conveyed by sensor output from a geo-location sensor of a capture devices, and/or other metadata.

The video summary component 110 may be configured to compare interest curve values corresponding to one or more identified curve attributes to one or more threshold curve values for the one or more curve attributes. The comparison may comprise, for example, determining whether one or more interest curve values may be greater than and/or equal to one or more threshold values. Based on a determination that one or more interest curve values may be greater than and/or equal to one or more threshold values, one or more frame images corresponding to those interest curve values may be included in a video summary.

By way of non-limiting example, considering again the first set of interest curve values corresponding to the first curve attribute of the first interest curve of the first video, video summary component 110 may be configured to include a first subset of frame images of the first video corresponding to the first set of interest curve values based on the first set of interest curve values being greater than or equal to the one or more threshold curve values for the first curve attribute.

By way of non-limiting illustration, a set of one or more threshold curve values of a first curve attribute may be specific to first content of a video. The first content of the video may comprise, for example, an action theme of the video, and/or other content. The first curve attribute may include a rate of change of an interest curve and/or other curve attributes. The set of one or more threshold curve values specific to the first curve attribute may include a specific rate of change. An action theme video may have been captured (and/or edited) to include a "build up" from a relatively unexciting part of the video (e.g., an insignificant event in the video) to a relatively exciting part of the video (e.g., a significant event in the video), in accordance with the action theme. The "build up" may be conveyed over a set of frame images. Within the set of frame images, the "build up" may correspond to a set of interest weights showing a change from relatively low interest weight to relatively high interest weight. If the interest weights in the set of interest weights are determined to change at a rate that is equal to or greater than the rate of change specified by a threshold curve value, then the set of frame images may be determined to be included in a video summary. If the interest weights in the set of interest weight values are determined to change at a rate that is different from the rate of change specified by a threshold curve value, then the set of frame images may be determined to not be included in a video summary.

By way of non-limiting illustration, a set of one or more threshold curve values of a second curve attribute and a third curve attribute may be specific to second content of a video. The second content of the video may comprise, for example, a dramatic theme of the video, and/or other content. The second curve attribute may include a portion of constant values of an interest curve and/or other curve attributes. The third curve attribute may include a maximum value (or values) of an interest curve and/or other curve attributes. A threshold curve value specific to the second curve attribute may specify a value that may be constant at a specified value over a specified quantity of frame images. A threshold curve value specific to the third curve attribute may specify a maximum (value or values) that may occur after a portion of constant interest curve values and may differ from the constant interest curve values by a given amount. A dramatic theme video may have been captured (and/or edited) to include a dramatic event that starts from a relatively unexciting and unchanging part of the video (e.g., an insignificant event in the video) and may spike to a relatively exciting part of the video (e.g., a significant, and dramatic, event in the video), in accordance with the dramatic theme. The dramatic event may be conveyed over a set of frame images. Within the set of frame images, the dramatic event may correspond to a set of interest weights of the frame images in the set of frame images showing no change in interest weight to a spike to a high (e.g., maximum) interest weight. If the interest weights of the frame images in the set of frame images are determined to be a constant value occurring over a quantity of frame images that is greater or equal to specified threshold curve values, and the spike to the high (e.g., maximum) interest weight differs from the constant values by an amount that is equal to or greater than that specified by a threshold curve value, then the set of frame images may be determined to be included in a video summary. If the interest weights of the frame images in the set of frame images are determined to be a constant value occurring over a quantity of frame images that is less than the specified threshold curve values, and the spike to the high (e.g., maximum) interest weight differs from the constant values by an amount that is less than that specified by a threshold curve value, then the set of frame images may be determined to not be included in a video summary.

By way of non-limiting illustration, a set of one or more threshold curve values of a fourth curve attribute may be specific to third content of a video. The third content of the video may comprise, for example, an action portrayed in the video, and/or other content. The fourth curve attribute may include a maximum of an interest curve and/or other curve attributes. The set of one or more threshold curve values specific to the fourth curve attribute may include a specified interest weight maximum value over a specified quantity of frame images. An action portrayed in the video may take place over a particular length of time (and/or particular quantity of frame images). If interest weights of frame images in a set of frame images are determined to have a maximum value that is greater than and/or equal to a value specified by a threshold curve value, and/or the set of frame images includes a quantity of frame images that is greater than and/or equal to that specified by a threshold curve value, then the set of frame images may be determined to be included in a video summary. For example, the action may comprise a surfing maneuver on a wave. A set of threshold curve values may specify a maximum interest weight and/or a given quantity of frame images at which that maximum occurs. If interest weights of frame images in a set of frame images are determined to have a maximum value that is greater than and/or equal to the value specified by the set of threshold curve values and includes a quantity of frame images specified by the set of threshold curve values, then the set of frame images may be determined to correspond to an "interesting" surfing maneuver and may be included in a video summary.

By way of non-limiting illustration, a set of one or more threshold curve values of a fifth curve attribute may be specific to fourth content of a video. The fourth content of the video may comprise, for example, metadata conveying a resolution setting of a capture device, and/or other information included in metadata. The fifth curve attribute may include a maximum of an interest curve and/or other curve attributes. The set of one or more threshold curve values specific to the fifth curve attribute may include a predetermined interest weight maximum value. If interest weights of frame images in a set of frame images are determined to have a value that is less than a value specified by a threshold curve value, then the set of frame images may be determined to not be included in a video summary. For example, a resolution of a capture device may impact interest weights of the set of frame images, such that if interest curve values having an interest weight component are below the threshold curve value, then the set of frame images may be determined to correspond to low resolution frame images and may not be included in a video summary.

Figure 6:
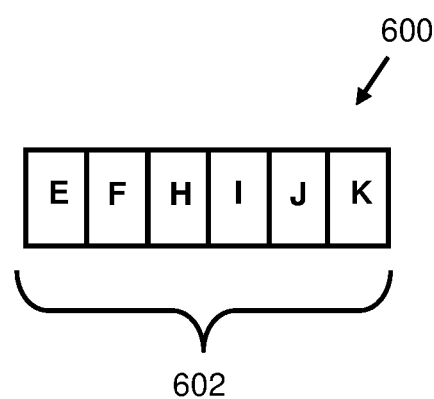
FIG. 6 illustrate an exemplary video summary having a subset of the frame images of the video of FIG. 3.

By way of non-limiting illustration, video summary component 110 (FIG. 1) may be configured to include a subset of frame images 602 (FIG. 6) from the set of frame images 302 (FIG. 3) in a video summary 600 (FIG. 6). In FIG. 6, subset of frame images 602 may include the frame images E, F, and H through K. The subset of frame images 602 may be included in video summary 600 based on interest curve values of interest curve 400 (FIG. 5) corresponding to second curve attribute 504 and fourth curve attribute 508 being greater than and/or equal to one or more threshold curve attributes for second curve attribute 504 and fourth curve attribute 508, respectively. By way of non-limiting illustration, a threshold curve value for second curve attribute 504 (e.g., local maximum) may be a value of "10" (the interest curve values for second curve attribute 504 in interest curve 400 being "11"). By way of non-limiting illustration, a threshold curve value for fourth curve attribute 508 (e.g., rate of change) may be a value of "increase at a rate of 2 interest weight units per frame image" (with interest curve values for fourth curve attribute 508 in interest curve 400 increasing at a rate of 3 interest weight units per frame image).

While the present disclosure may be directed to videos, one or more other implementations of the system may be configured for other types media content. Other types of media content may include one or more of audio content (e.g., music, podcasts, audio books, and/or other audio content), multimedia presentations, photos, slideshows, and/or other media content.

Returning to FIG. 1, although processor 11 and electronic storage 12 are shown to be connected to an interface 13 in FIG. 1, any communication medium may be used to facilitate interaction between any components of system 10. One or more components of system 10 may communicate with each other through hard-wired communication, wireless communication, or both. For example, one or more components of system 10 may communicate with each other through a network. For example, processor 11 may wirelessly communicate with electronic storage 12. By way of non-limiting example, wireless communication may include one or more of radio communication, Bluetooth communication, Wi-Fi communication, cellular communication, infrared communication, or other wireless communication. Other types of communications are contemplated by the present disclosure.

Although processor 11 is shown in FIG. 1 as a single entity, this is for illustrative purposes only. In some implementations, processor 11 may comprise a plurality of processing units. These processing units may be physically located within the same device, or processor 11 may represent processing functionality of a plurality of devices operating in coordination. Processor 11 may be configured to execute one or more components by software; hardware; firmware; some combination of software, hardware, and/or firmware; and/or other mechanisms for configuring processing capabilities on processor 11.

It should be appreciated that although computer components are illustrated in FIG. 1 as being co-located within a single processing unit, in implementations in which processor 11 comprises multiple processing units, one or more of computer program components may be located remotely from the other computer program components.

The description of the functionality provided by the different computer program components described herein is for illustrative purposes, and is not intended to be limiting, as any of computer program components may provide more or less functionality than is described. For example, one or more of computer program components 102, 104, 106, 108, and/or 110 may be eliminated, and some or all of its functionality may be provided by other computer program components. As another example, processor 11 may be configured to execute one or more additional computer program components that may perform some or all of the functionality attributed to one or more of computer program components 102, 104, 106, 108, and/or 110 described herein.

The electronic storage media of electronic storage 12 may be provided integrally (i.e., substantially non-removable) with one or more components of system 10 and/or removable storage that is connectable to one or more components of system 10 via, for example, a port (e.g., a USB port, a Firewire port, etc.) or a drive (e.g., a disk drive, etc.). Electronic storage 12 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. Electronic storage 12 may be a separate component within system 10, or electronic storage 12 may be provided integrally with one or more other components of system 10 (e.g., processor 11). Although electronic storage 12 is shown in FIG. 1 as a single entity, this is for illustrative purposes only. In some implementations, electronic storage 12 may comprise a plurality of storage units. These storage units may be physically located within the same device, or electronic storage 12 may represent storage functionality of a plurality of devices operating in coordination.

Figure 2:
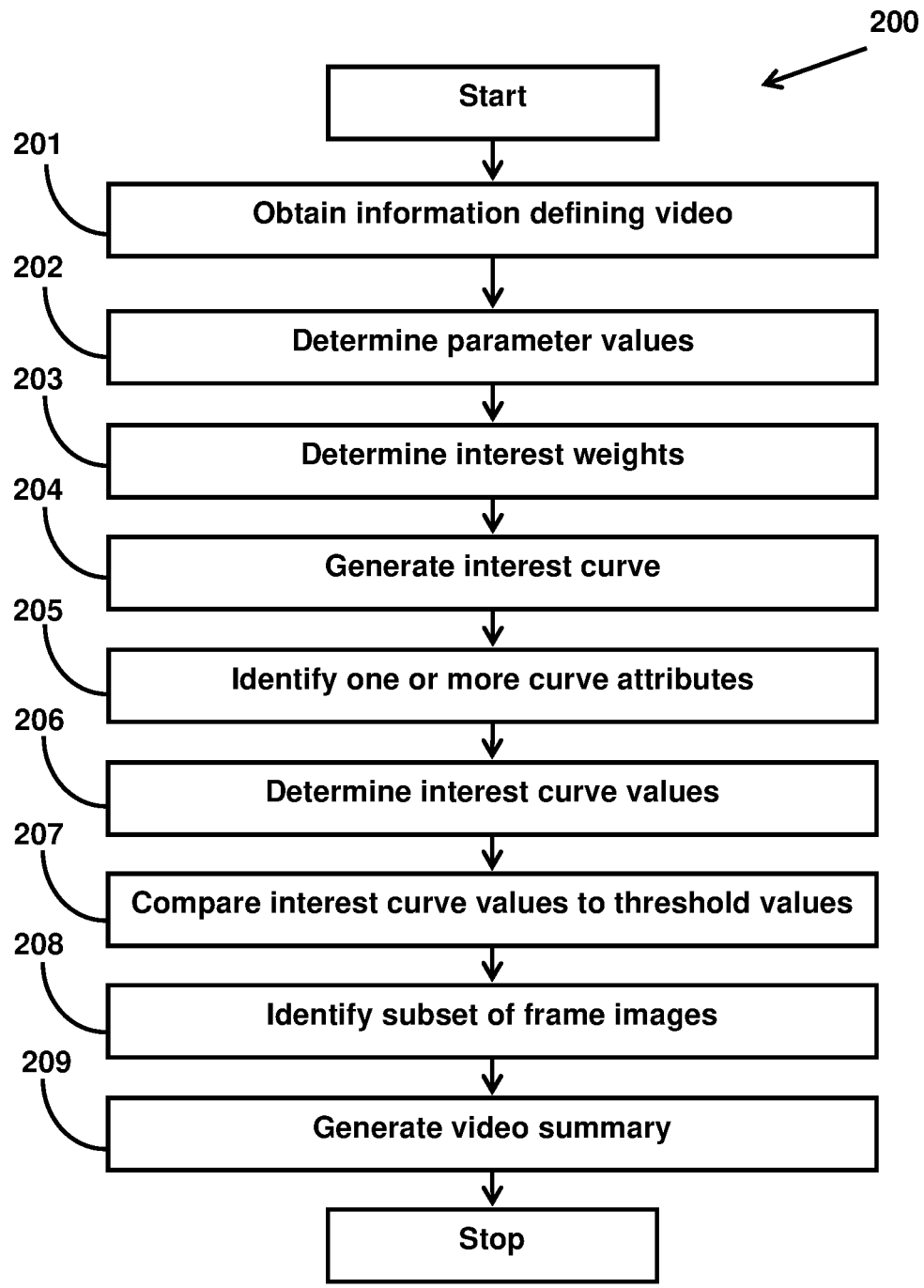
FIG. 2 illustrates a method of generating a video summary, in accordance with one or more implementations.

FIG. 2 illustrates method 200 of generating a video summary, in accordance with one or more implementations. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in a computer system comprising one or more of one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information), non-transitory electronic storage storing machine-readable instructions, and/or other components. The one or more processing devices may include one or more devices executing some or all of the operations of method 200 in response to instructions stored electronically on one or more electronic storage mediums. The one or more processing devices may include one or more devices configured through hardware, firmware, and/or software to be specifically designed for execution of one or more of the operations of method 200.

Referring to FIG. 2 and method 200, at operation 201, information defining a video may be obtained. The video may include a set of frame images. Information defining a video may be obtained from electronic storage and/or from other locations. In some implementations, operation 201 may be performed by a processor component the same as or similar to video component 102 (shown in FIG. 1 and described herein).

At operation 202, individual parameter values for one or more parameters of individual frame images in the set of frame images of the video may be determined. The parameter values may include a first set of parameter values for a first parameter of the individual frame images in the set of frame images and/or other parameter values for other parameters. In some implementations, operation 202 may be performed by a processor component the same as or similar to parameter component 104 (shown in FIG. 1 and described herein).

At operation 203, interest weights for the individual frame images may be determined. Interest weights may be determined based on individual parameter values of individual parameters of the individual frame images, and/or other information. By way of non-limiting illustration, a first set of interest weights for the set of frame images may be determined from the first set of parameter values and/or other information. In some implementations, operation 203 may be performed by a processor component the same as or similar to interest weight component 106 (shown in FIG. 1 and described herein).

At operation 204, an interest curve for the video may be generated based on the individual interest weights of the individual frame images in the set of frame images. The interest curve may characterize the video by interest weights as a function of progress through the set of frame images of the video. The interest curve may be comprised of a set of interest curve values that individually correspond to individual ones of the interest weights in the first set of interest weights and individual ones of the frame images in the set of frame images. In some implementations, operation 204 may be performed by a processor component the same as or similar to interest curve component 108 (shown in FIG. 1 and described herein).

At operation 205, one or more curve attributes of an interest curve may be identified. By way of non-limiting illustration, the one or more curve attributes may include a first curve attribute and/or other curve attributes. In some implementations, operation 205 may be performed by a processor component the same as or similar to interest curve component 108 (shown in FIG. 1 and described herein).

At operation 206, individual interest curve values of the interest curve that correspond to individual curve attributes may be determined. By way of non-limiting illustration, a first set of interest curve values corresponding to the first curve attribute may be determined from the interest curve. In some implementations, operation 206 may be performed by a processor component the same as or similar to interest weight component 112 (shown in FIG. 1 and described herein).

At operation 207, individual interest curve values of the interest curve that correspond to individual identified curve attributes may be compared to individual threshold curve values. Individual threshold curve values may correspond to individual curve attributes. By way of non-limiting illustration, the first set of interest curve values may be compared to one or more threshold values for the first curve attribute. In some implementations, operation 207 may be performed by a processor component the same as or similar to video summary component 110 (shown in FIG. 1 and described herein).

At operation 208, a subset of frame images of the video to include within a video summary may be identified based on the comparison. In some implementations, operation 208 may be performed by a processor component the same as or similar to video summary component 110 (shown in FIG. 1 and described herein).

At operation 209, the video summary may be generated using the subset of frame images. In some implementations, operation 209 may be performed by a processor component the same as or similar to video summary component 110 (shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system configured to generate a video summary, the system comprising:
   one or more physical computer processors configured by computer readable instructions to:
      obtain information defining a video, the video including a set of images;
      determine individual parameter values for one or more parameters of individual images of the video;
      determine individual interest weights of the individual images based on the individual parameter values of the one or more parameters of the individual images, wherein determining a given interest weight of a given image comprises determining impact of individual parameter values on the given interest weight;
      generate an interest curve for the video based on the individual interest weights of the individual images, the interest curve characterizing the video based on the interest weights as a function of progress through the set of images;
      identify curve attributes of the interest curve, the identified curve attributes characterizing a maximum and a plateau of the interest curve;
      identify one or more subsets of images of the video for inclusion within the video summary based on the identified curve attributes of the interest curve; and
      generate the video summary based on the identification of the one or more subsets of the images of the video.

2. The system of claim 1, wherein the one or more subset of images of the video are identified further based on corresponding values of the interest curve being greater than one or more threshold curve values.

3. The system of claim 2, wherein the one or more threshold curve values are specific to content of the video.

4. The system of claim 1, wherein the identified curve attributes further characterize one or more of an overall shape, an infection point, a minimum, a rate of change, or a rate of the rate of change of the interest curve.

5. The system of claim 1, wherein the one or more parameters include one or more of a scene parameter, a quality parameter, a capture parameter, or an audio parameter.

6. The system of claim 5, wherein the scene parameter specifies one or more scene features of the individual images, the one or more scene features including one or more of feature points, objects, faces, colors, scene compilation, or text of the individual images.

7. The system of claim 6, wherein the quality parameter specifics one or more quality attributes of the individual images, the one or more quality attributes including one or more of blurriness, glare, saturation, brightness, contrast, sharpness, framing of an object of interest, of a representativeness of the individual images with respect to an overall context of the video.

8. The system of claim 1, wherein the impact of individual parameter values on the given interest weight is determined based on a convolutional neural network.

9. The system of claim 1, wherein the information defining the video includes metadata associated with the video, and the individual parameter values for the one or more parameters of the individual images of the video are determined further based on the metadata.

10. The system of claim 9, wherein the metadata associated with the video includes one or more of capture settings of a capture device, sensor output of one or more sensors coupled to the capture device, or user-provided information.

11. A method of generating a video summary, the method being implemented in a computer system comprising one or more physical processors and storage media storing machine-readable instructions, the method comprising:
   obtaining, by the computing system, information defining a video, the video including a set of images;
   determining, by the computing system, individual parameter values for one or more parameters of individual images of the video;
   determining, by the computing system, interest weights of the individual images based on the individual parameter values of the one or more parameters of the individual images, wherein determining a given interest weight of a given image comprises determining impact of individual parameter values on the given interest weight;
   generating, by the computing system, an interest curve for the video based on the individual interest weights of the individual images, the interest curve characterizing the video based on the interest weights as a function of progress through the set of images;
   identifying, by the computing system, curve attributes of the interest curve, the identified curve attributes characterizing a maximum and a plateau of the interest curve;
   identifying, by the computing system, one or more subsets of images of the video for inclusion within the video summary based on the identified curve attributes of the interest curve; and
   generating, by the computing system, the video summary based on the identification of the one or more subsets of the images of the video.

12. The method of claim 11, wherein the one or more subset of images of the video are identified further based on corresponding values of the interest curve being greater than one or more threshold curve values.

13. The method of claim 12, wherein the one or more threshold curve values are specific to content of the video.

14. The method of claim 11, wherein the identified curve attributes further characterize one or more of an overall shape, an infection point, a minimum, a rate of change, or a rate of the rate of change of the interest curve.

15. The method of claim 11, wherein the one or more parameters include one or more of a scene parameter, a quality parameter, a capture parameter, or an audio parameter.

16. The method of claim 15, wherein the scene parameter specifies one or more scene features of the individual images, the one or more scene features including one or more of feature points, objects, faces, colors, scene compilation, or text of the individual images.

17. The method of claim 16, wherein the quality parameter specifics one or more quality attributes of the individual images, the one or more quality attributes including one or more of blurriness, glare, saturation, brightness, contrast, sharpness, framing of an object of interest, of a representativeness of the individual images with respect to an overall context of the video.

18. The method of claim 11, wherein the impact of individual parameter values on the given interest weight is determined based on a convolutional neural network.

19. The method of claim 11, wherein the information defining the video includes metadata associated with the video, and the individual parameter values for the one or more parameters of the individual images of the video are determined further based on the metadata.

20. The method of claim 19, wherein the metadata associated with the video includes one or more of capture settings of a capture device, sensor output of one or more sensors coupled to the capture device, or user-provided information.

* * * * *